United States Patent [19]

vom Dorp et al.

[11] 4,077,286

[45] Mar. 7, 1978

[54] VERTICAL BORING AND TURNING MILL

[75] Inventors: Heinz vom Dorp; Hermann Wolters, both of Monchen-Gladbach, Germany

[73] Assignee: Firma W. Hegenscheidt Gesellschaft mbH, Erkelenz, Germany

[21] Appl. No.: 778,611

[22] Filed: Mar. 17, 1977

[30] Foreign Application Priority Data

Apr. 1, 1976 Germany .............................. 2614003

[51] Int. Cl.² .............................................. B23B 3/00
[52] U.S. Cl. ...................................................... 82/2 D
[58] Field of Search ................................... 82/2 R, 2 D

[56] References Cited

U.S. PATENT DOCUMENTS

| 683,592 | 10/1901 | Bullard, Jr. | 82/2 D |
| 2,324,180 | 7/1943 | Trosch | 82/2 D |
| 3,260,140 | 7/1966 | Burge | 82/2 D |

FOREIGN PATENT DOCUMENTS 461,097  11/1949  Canada ................................. 82/2 D

*Primary Examiner*—Harrison L. Hinson
*Attorney, Agent, or Firm*—W. G. Fasse; W. W. Roberts

[57] ABSTRACT

A vertical boring and turning mill has a base and a rotatable table supported on the base as well as an upright frame carrying a horizontal cross beam, which in turn carries a plurality of horizontally adjustable slides or carriages. Each slide or carriage supports a vertically adjustable tool slide or support. The vertical carriages of at least two tool supports are coupled to each other in such a manner that at least two supports have a common drive and control mechanism, whereby substantial savings are achieved.

8 Claims, 1 Drawing Figure

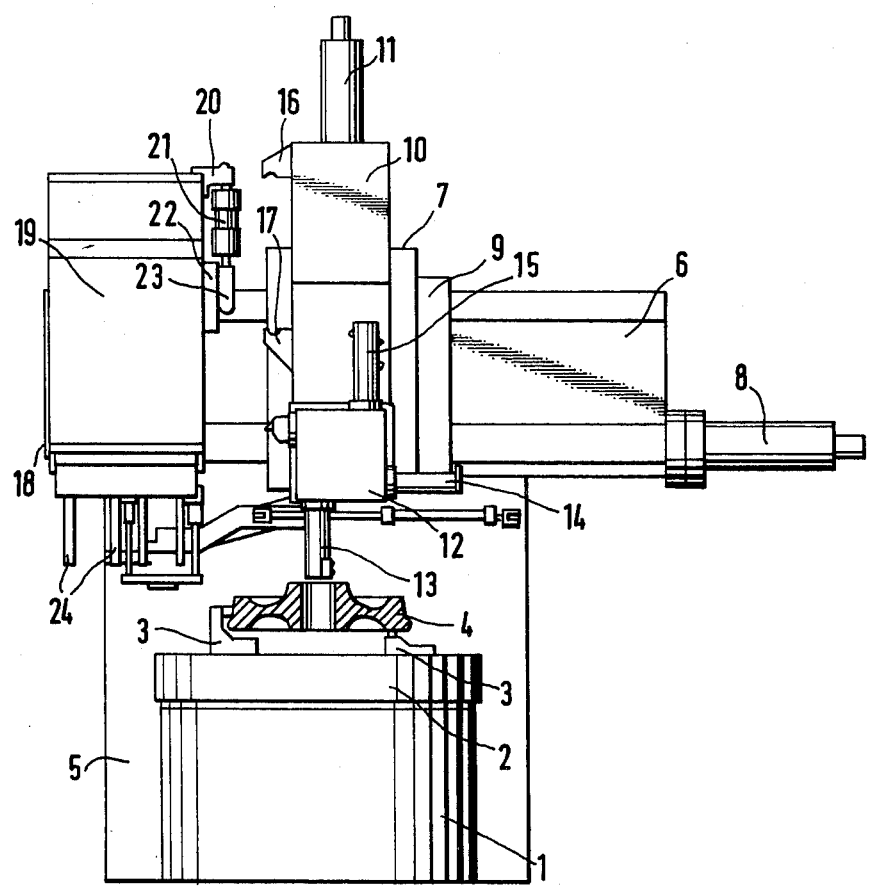

VERTICAL BORING AND TURNING MILL

BACKGROUND OF THE INVENTION

The present invention relates to a vertical boring and turning mill, more specifically, to a machine of this type in which the workpieces are held or secured on the so called table arranged adjacent to an upright post which supports a cross beam above the table. Several supports are carried by the cross beam, which guides horizontal carriages for their horizontal adjustment or displacement. The horizontal carriages in turn carry vertically adjustable slides which in turn hold the tools.

Such machines are also known as vertical turret boring machines and several modifications are well known in the art. Such machines are used for the turning of very heavy workpieces having large diameters. The workpieces are secured to a horizontal turning table which rotates during the working of the machine much like a merry-go-round. Depending on the type of load for which any particular machine is designed, these machines are provided with a movable or a rigid, stationary cross beam which carries one or several so called supports for the working of a workpiece. Each support comprises normally a horizontal slide which is adjustable in parallel to the cross beam in the horizontal direction and a vertical slide which is adjustable in the vertical direction perpendicularly to the cross beam. The vertical slide normally carries the tools.

Heretofore it was customary to provide a separate drive and control mechanism for each of the two adjustments. In other words, each slide used to have its own drive and control mechanism for the feed advance as well as for the rapid advance. Such drive means are rather expensive, especially if they require so called "NC" controls. However, such costs cannot be avoided if it is required that several supports work simultaneously on the workpiece. However, in many instances such simultaneous use of several supports is not necessary. In practice, it is rather the rule that the individual supports are employed sequentially one after the other for performing the required working operations.

OBJECTS OF THE INVENTION

In view of the above, it is the aim of the invention to achieve the following objects, singly or in combination:

to reduce the structural and control elements for the machines of the described type, whereby to reduce their costs where their intended use is satisfactory, if certain supports may be operated sequentially, whereby this aim is to be accomplished without limiting the control possibilities of any individual supports, while simultaneously maintaining the sequential movability of all the supports;

to sequentially operate several supports by means of two drive mechanisms;

to operate two supports by means of a single drive and control mechanism; and to adjust and control two supports selectively by means of a horizontal drive and a vertical drive so that both supports are sequentially adjustable in both, the horizontal and the vertical directions.

SUMMARY OF THE INVENTION

According to the invention there is provided a vertical boring and turning mill provided with at least one positively driven support and at least one indirectly drivable support wherein both supports may be coupled to each other through respective coupling means. Preferably, the coupling means are provided as part of the respective vertical slides of the support.

Due to the foregoing teaching of the invention, it becomes now possible to move several supports with the aid of but two drive mechanisms. Thus, with the horizontal and vertical drive means of one of the supports that support may be adjusted horizontally and vertically either alone or in conjunction with the support which is not provided with its own drive and control mechanism. The arrangement is such that the support without its own drive means is located in a non-interfering position when the positively driven support operates. As soon as the working operations of the positively driven support are completed and when it becomes necessary to now use the indirectly driven support for the further working of the workpieces, the positively driven support is moved into a position adjacent to the indirectly driven support where the two supports are coupled to each other through their respective vertical slides so that now all movements of the positively driven support are also performed by the indirectly driven support in response to the control values supplied to the drive mechanism of the positively driven support.

Due to the described coupling, the two supports move in unison which movement corresponds to the necessary working movement of the indirectly driven support, which in this phase of the operation is the only support in working position. Upon the completion of the working of a workpiece by the indirectly driven support, the positively driven support returns the indirectly driven support into its outer, non-interfering position where the coupling between the two may be released and the indirectly driven support arrested in its non-operating position.

Preferably, according to the invention, the positively driven support is provided with a horizontal drive mechanism for its horizontal slide and with a vertical drive mechanism for its vertical slide. It has been found to be advantageous to arrange the coupling means as part of the vertical slide of the positively driven support, whereby the coupling means comprise two prism cams vertically spaced from each other, while the vertical slide of the indirectly driven support comprises a fixed cam and an adjustable cam arranged below the fixed cam. A coupling piston cylinder arrangement is connected between the fixed and adjustable cam. In this context the positively driven support is directly connected to its respective drive means, whereas the indirectly driven support is referred to as the other support means.

The piston cylinder means of the coupling mechanism preferably comprise a hydraulic cylinder, the upper end of which is connected to the fixed cam member and the lower end of its piston rod is connected to the adjustable or movable cam member. Preferably, the movable cam member is guided in a cam guide groove or the like arranged laterally alongside the vertical slide of the other or indirectly driven support.

BRIEF FIGURE DESCRIPTION

In order that the invention may be clearly understood, it will now be described, by way of example, with reference to the single FIGURE of the accompanying drawings, wherein a somewhat schematic front view illustrates the present invention.

DETAILED DESCRIPTION OF PREFERRED EXAMPLE EMBODIMENTS

The FIGURE shows a front view of a vertical boring and turning mill according to the invention. A console or base 1 carries in a rotatable manner a horizontal table 2. The chucking or clamping device 3 clamps the workpiece 4 to be machined to the surface of the table 2. A vertical, upright post 5 carries the cross beam 6 in a position above the table 2. The cross beam 6 supports a support 7. The support 7 is movable horizontally along the cross beam 6 by means of a horizontal slide 9 driven by a horizontal drive mechanism 8. The vertical slide 10 is supported for vertical adjustment on the horizontal slide 9. A vertical drive mechanism 11 is arranged for adjusting the vertical slide 10 up and down. A revolving head 12 is operatively secured to the lower end of the vertical slide 10. The revolving head 12 carries the working tools 13, 14 and 15. According to the invention two cam prisms 16 and 17 are rigidly secured to the vertical slide 10 of the support 7. The cam prisms 16 and 17 have a predetermined spacing from each other, as will be explained in more detail below.

The cross beam 6 carries a further support 18 horizontally spaced from the positively driven support 7. The further support 18 is driven indirectly through the drive means of the support 7 according to the invention. As shown the support 18 is located in a locking or arresting position to the side of the support 7. The support 18, which is not provided with its own drive has a vertical slide 19, which is provided at its upper end with a rigidly secured cam 20. A movable cam 23 is located vertically below the stationary cam 20 for engagement with the cams 16 and 17 by means of a piston cylinder arrangement 21 which enables the vertical up and down adjustment of the cam 23. The piston cylinder arrangement 21 is preferably of the hydraulic kind. The upper end of the cylinder is secured to the rigid cam 20 and the lower end is connected to the cam 23 which is slidable in a cam guide 22. At the lower end of the vertical slide 9 of the other support 18 which is indirectly driven by the drive means of the support 7, there are provided further tools, for example, drilling tools 24.

In operation, when the positively driven support 7 or rather the tools carried by the support 7 have completed their work steps and it now becomes necessary to bring the other support 18 into the working position, the vertical slide 10 of the support 7 is advanced in the direction toward the support 18 to such an extent that the movable cam 23 of the support 18 is located directly above the rigid lower cam prism 17 of the vertical slide 10 of the support 7. In this position the coupling piston cylinder arrangement 21 is supplied with working liquid, for example oil under pressure, so that the movable cam 23 engages the rigid cam prism 17. The displacement for accomplishing this engagement should be as short as possible. As the piston of the piston cylinder arrangement 21 of the support 18 is further supplied with pressure, the vertical slide 19 is lifted out of its arresting, inoperative position while simultaneously the rigid cam 20 is pressed into the cam prism 16 of the vertical slide 10 of the support 7.

The just described engagement rigidly locks the passively driven support 18 with the positively or actively driven support 7 through the vertical slide 10 of the support 7 so that both supports are now movable in unison and the support 18 follows all the movements of the support 7 including the feed advance movement, as well as the rapid advance movement. The horizontal drive mechanism 8 is thus enabled to either drive the support 7 alone or both the supports 7 and 18, whereby in the latter instant only the support 18 may be used for the working operation, if desired. The vertical drive mechanism 11 imparts a vertical feed advance and rapid advance movement either to the vertical slide 10 of the support 7 or to both vertical slides 10 and 19 of the support 7 and 18, whereby again the vertical slide 19 of the support 18 may be used alone, if desired. Thus, according to the invention, it has become possible and advantageous to employ the horizontal drive means 8 and the vertical drive means 11 including the respective control means (not shown) for the operation of the support 7 or for the operation of the supports 7 and 18.

Although the invention has been described with reference to specific example embodiments, it will be appreciated, that it is intended to cover all modifications and equivalents within the scope of the amended claims.

What is claimed is:

1. A vertical boring and turning mill comprising a base, table means rotatably supported on said base, upright frame means, horizontal cross beam means supported by said upright frame means, support means on said cross beam, a plurality of horizontal slide means supported for horizontal adjustment along said cross beam, a further plurality of tool supporting vertical slide means carried on said horizontal slide means for vertical adjustment along said horizontal slide means, positive drive means operatively connected to at least one of said slide means for positively driving said one slide means, and coupling means arranged for operatively interconnecting at least one other slide means to said drive means connected, positively driven slide means.

2. The mill of claim 1, wherein said support means comprise at least one positively driven support and at least one further support passively driven through said coupling means.

3. The mill of claim 2, wherein said positively driven support comprises horizontal drive means for said horizontal slide means and vertical drive means for said vertical slide means.

4. The mill of claim 1, wherein said coupling means comprise two cam prism means secured to said drive means connected slide means, said other slide means comprising a fixed cam and an adjustable cam spaced from said fixed cam, and power actuating means connected to said adjustable cam for engaging said fixed cam and said adjustable cam with said prism cam means to operatively interconnect said drive means connected slide means and said other slide means.

5. The mill of claim 4, wherein said two prism cam means and said fixed and adjustable cams are vertically spaced respectively.

6. The mill of claim 4, wherein said power actuating means comprise a hydraulic coupling piston cylinder means, one end of which is connected to said fixed cam and the other end of which is connected to the adjustable cam.

7. The mill of claim 6, wherein said fixed cam and said adjustable cam are vertically spaced from each other, said coupling piston cylinder means having an upper end connected to said fixed cam and a lower end connected to said adjustable cam.

8. The mill of claim 5, further comprising cam guide means laterally secured to said other slide means, said adjustable cam gliding in said cam guide means.

* * * * *